United States Patent
Imura et al.

(10) Patent No.: US 10,497,514 B2
(45) Date of Patent: *Dec. 3, 2019

(54) DIELECTRIC COMPOSITION, DIELECTRIC ELEMENT, ELECTRONIC COMPONENT AND LAMINATED ELECTRIC COMPONENT

(71) Applicant: TDK Electronics AG, München (DE)

(72) Inventors: Tomoya Imura, Tokyo (JP); Goushi Tauchi, Tokyo (JP); Masakazu Hirose, Tokyo (JP); Tomohiro Terada, Tokyo (JP)

(73) Assignee: TDK ELECTRONICS AG, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/745,696

(22) PCT Filed: Jun. 16, 2016

(86) PCT No.: PCT/EP2016/063836
§ 371 (c)(1),
(2) Date: Jan. 17, 2018

(87) PCT Pub. No.: WO2017/012788
PCT Pub. Date: Jan. 26, 2017

(65) Prior Publication Data
US 2018/0211781 A1  Jul. 26, 2018

(30) Foreign Application Priority Data
Jul. 17, 2015 (JP) .................................. 2015-143407

(51) Int. Cl.
*C04B 35/475* (2006.01)
*H01G 4/12* (2006.01)
(Continued)

(52) U.S. Cl.
CPC ......... *H01G 4/1227* (2013.01); *C04B 35/462* (2013.01); *C04B 35/47* (2013.01);
(Continued)

(58) Field of Classification Search
CPC ............................ C04B 35/475; H01G 4/1227
See application file for complete search history.

(56) References Cited

U.S. PATENT DOCUMENTS

| 4,119,554 A | 10/1978 | Fujiwara |
| 6,656,865 B2 | 12/2003 | Saito et al. |

(Continued)

FOREIGN PATENT DOCUMENTS

| CN | 1331476 A | 1/2002 |
| CN | 101665354 A | 3/2010 |

(Continued)

OTHER PUBLICATIONS

Parija, B. et al., "Structure, Microstructure and Dielectric Properties of 100-x(Bi0.5Na0.5)TiO3-x[SrTiO3] Composites Ceramics," Applied Physics A Materials Science & Processing, vol. 109, No. 3, Aug. 25, 2012, 9 pages.

(Continued)

*Primary Examiner* — Karl E Group
(74) *Attorney, Agent, or Firm* — Slater Matsil, LLP

(57) ABSTRACT

A dielectric composition, a dielectric element, an electronic component and a laminated electric component are disclosed. In an embodiment a dielectric composition has a perovskite crystal structure containing at least Bi, Na, Sr and Ti, wherein the dielectric composition includes a high-Bi phase in which the Bi concentration is at least 1.2 times the mean Bi concentration in the dielectric composition as a whole.

20 Claims, 3 Drawing Sheets

(51) Int. Cl.
  *C04B 35/462* (2006.01)
  *C04B 35/47* (2006.01)
  *H01G 4/30* (2006.01)
  *C04B 35/626* (2006.01)
  *C04B 35/628* (2006.01)
  *C04B 35/64* (2006.01)
  *C04B 41/45* (2006.01)
  *C04B 41/51* (2006.01)
  *C04B 41/88* (2006.01)
  *H01G 4/012* (2006.01)
  *H01G 4/248* (2006.01)

(52) U.S. Cl.
  CPC ........ *C04B 35/475* (2013.01); *C04B 35/6261* (2013.01); *C04B 35/62645* (2013.01); *C04B 35/62821* (2013.01); *C04B 35/64* (2013.01); *C04B 41/4578* (2013.01); *C04B 41/5111* (2013.01); *C04B 41/88* (2013.01); *H01G 4/012* (2013.01); *H01G 4/1218* (2013.01); *H01G 4/30* (2013.01); *C04B 2235/3201* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3227* (2013.01); *C04B 2235/3229* (2013.01); *C04B 2235/3236* (2013.01); *C04B 2235/3284* (2013.01); *C04B 2235/3298* (2013.01); *C04B 2235/5436* (2013.01); *C04B 2235/5445* (2013.01); *C04B 2235/602* (2013.01); *C04B 2235/656* (2013.01); *C04B 2235/768* (2013.01); *C04B 2235/80* (2013.01); *C04B 2235/85* (2013.01); *H01G 4/248* (2013.01)

(56) References Cited

U.S. PATENT DOCUMENTS

| | | | |
|---|---|---|---|
| 8,076,257 | B1 | 12/2011 | Wilson |
| 9,530,563 | B2 | 12/2016 | Imura et al. |
| 2010/0053843 | A1 | 3/2010 | Muraki et al. |
| 2018/0211777 | A1* | 7/2018 | Tauchi ................ C04B 35/462 |
| 2018/0211779 | A1* | 7/2018 | Hirose .................. C04B 35/47 |
| 2018/0211781 | A1* | 7/2018 | Imura ................. C04B 35/462 |
| 2018/0218837 | A1* | 8/2018 | Hirose .................... H01G 4/30 |
| 2018/0218838 | A1* | 8/2018 | Imura ................. C01G 23/006 |
| 2018/0222801 | A1* | 8/2018 | Hirose ................ C04B 35/462 |

FOREIGN PATENT DOCUMENTS

| | | |
|---|---|---|
| JP | S4959297 A | 6/1974 |
| JP | 2002080276 A | 3/2002 |
| JP | 2005022891 A | 1/2005 |
| JP | 2014189465 A | 10/2014 |
| JP | 2018501899 A | 1/2018 |
| WO | 2014156302 A1 | 10/2014 |

OTHER PUBLICATIONS

Park, S.E. et al., "Variations of Structure and Dielectric Properties on Substituting A-Site Cations for Sr2+ in (Na1/2Bi1/2)TiO3," Journal of Materials Research, XP 055176745, vol. 12, No. 8, Aug. 1, 1997, 6 pages.

Vintila, R. et al., "Effect of A-Site Substitutions on the Microstructure and Dielectric Properties of Bismuth Sodium Titanate-Based Ceramics Exhibiting Morphotropic Phase Boundary," Advances in Electronic Ceramic Materials, vol. 26, No. 5, Jan. 23-28, 2005, 8 pages.

* cited by examiner

DIELECTRIC COMPOSITION, DIELECTRIC ELEMENT, ELECTRONIC COMPONENT AND LAMINATED ELECTRIC COMPONENT

This patent application is a national phase filing under section 371 of PCT/EP2016/063836, filed Jun. 16, 2016, which claims the priority of Japanese patent application 2015-143407, filed Jul. 17, 2015, each of which is incorporated herein by reference in its entirety.

TECHNICAL FIELD

The present invention relates to a dielectric composition which includes a perovskite crystal structure and is advantageous for medium- and high-voltage applications with a high rated voltage, and also to a dielectric element comprising the same, an electronic component and a laminated electronic component.

BACKGROUND

Recent years have seen increasing demand for miniaturization and increased reliability of dielectric elements as electronic circuits reach higher densities. Miniaturization of electronic components such as laminated ceramic capacitors, together with increased capacity and higher reliability are rapidly progressing, while the applications thereof are also expanding. Various characteristics are required as these applications expand. Materials having barium titanate ($BaTiO_3$) as the main component are often conventionally used as dielectric compositions.

For example, a smoothing capacitor or a snubber capacitor such as a motor vehicle DC-DC converter or AC-DC inverter is often used in a location in which a high DC bias of several hundred volts is applied.

There is therefore a problem with conventional electronic components having a dielectric layer comprising a dielectric composition which has $BaTiO_3$ as the main component in that there is a reduction in dielectric constant when a high DC bias is applied. This problem is due to the fact that $BaTiO_3$ is a ferroelectric material, so the dielectric constant tends to decrease the higher the DC bias. When electronic components having a dielectric layer comprising a dielectric composition which has $BaTiO_3$ as the main component are used for applications involving high DC bias application it is therefore necessary to devise a method for using such electronic components, for example. According to one example of a known method, the amount of reduction in the dielectric constant is anticipated and a plurality of the electronic components is connected in parallel for use in order to maintain the required capacitance or dielectric constant.

Furthermore, in a conventional dielectric composition having $BaTiO_3$ as the main component, the field intensity applied to the dielectric layer is small during use under a low DC bias such as several volts or less, so the thickness of the dielectric layers can be set to a sufficiently thin level that breakdown does not occur. This means that there are essentially no problems such as short circuiting defects which occur as a result of breakdown of the dielectric layer. However, reductions in insulation resistance and short circuiting defects etc. caused by the dielectric composition itself become a problem during use under a high DC bias such as several hundred volts or greater. The dielectric composition forming the dielectric layer therefore needs to be extremely reliable.

In the prior art, dielectric compositions having improved reliability have been developed by adding a paraelectric such as barium zirconate. However, even greater reliability has become desirable in recent years.

Japanese Patent Application JP 2000-223351 A describes a laminated ceramic capacitor in which the temperature characteristics, dielectric constant and high-temperature load lifespan are improved by setting a specific range for the surface area ratio of a core and a shell in dielectric ceramic particles having a core-shell structure.

However, the improvement in high-temperature load lifespan is inadequate with the laminated ceramic capacitor described in Japanese Patent Application JP 2000-223351 A and further improvements are needed.

Furthermore, Japanese Patent Application JP 2005-22891 A mentioned below describes a dielectric porcelain comprising perovskite barium titanate crystal grains in which part of the B site of $BaTiO_3$, which is a ferroelectric material, is substituted with Zr (BTZ-type crystal grains), and likewise comprising perovskite bismuth sodium titanate crystal grains (BNST-type crystal grains). In that dielectric porcelain, Mg, Mn and at least one rare earth element are present in the grain boundary phase between the BTZ-type crystal grains and the BNST-type crystal grains. In addition, the dielectric porcelain has a core-shell structure in which the mean particle size of both the BTZ-type crystal grains and the BNST-type crystal grains is 0.3-1.0 μm.

However, with the dielectric porcelain and laminated ceramic capacitor described in Japanese Patent Application JP 2005-22891 A, there is a large reduction in dielectric constant with respect to DC bias and the dielectric constant cannot be considered adequate for use under a high voltage, for instance in a smoothing capacitor or a snubber capacitor such as a motor vehicle DC-DC converter or AC-DC inverter. Further improvement in the dielectric constant when a DC bias is applied is therefore needed.

SUMMARY OF THE INVENTION

Embodiments of the present invention provide a dielectric composition which can be used in a power supply circuit with a high rated voltage and has an excellent dielectric constant when a DC bias is applied and an excellent high-temperature load lifespan. Further embodiments provide a dielectric element comprising the same, an electronic component and a laminated electronic component.

Embodiments of the invention provide a dielectric composition having a perovskite crystal structure containing at least Bi, Na, Sr and Ti, wherein: the dielectric composition includes a high-Bi phase in which the Bi concentration is at least 1.2 times the mean Bi concentration in the dielectric composition as a whole.

The dielectric composition having the abovementioned constitution has an excellent dielectric constant when a DC bias is applied and an excellent high-temperature load lifespan.

Further embodiments provide α, 0<α≤0.150, where α is the surface area proportion of the high-Bi phase in the cross section of the dielectric composition, with respect to the whole of said cross section.

By setting 0<α≤0.150, it is possible to further improve the high-temperature load lifespan.

Other embodiments provide β, 0.125≤β≤2.000, where β is the molar ratio of Bi with respect to Sr in the dielectric composition.

By virtue of the fact that $0.125 \leq \beta \leq 2.000$ is satisfied, it is possible to further improve the dielectric constant when a DC bias is applied.

Various other embodiments provide a dielectric composition comprising at least one element selected from La, Ce, Pr, Nd, Sm, Eu, Gd, Tb, Dy, Ho, Yb, Ba, Ca, Mg and Zn.

By virtue of the fact that the dielectric composition comprises at least one selected from among La, Ce, Pr, Nd, Sm, Eu, Gd, Tb, Dy, Ho, Yb, Ba, Ca, Mg and Zn, it is possible to further improve the DC bias characteristics.

In yet other embodiments, the content of the at least one selected element from La, Ce, Pr, Nd, Sm, Eu, Gd, Tb, Dy, Ho, Yb, Ba, Ca, Mg and Zn is between 1 molar part and 15 molar parts, taking the Ti content of the dielectric composition as 100 molar parts.

By setting the content of the at least one selected from among La, Ce, Pr, Nd, Sm, Eu, Gd, Tb, Dy, Ho, Yb, Ba, Ca, Mg and Zn at between 1 molar part and 15 molar parts, it is possible to further improve the DC bias characteristics.

In addition, the dielectric composition may comprise Li, the Li content being between 0.1 molar parts and 5 molar parts, taking the Ti content of the dielectric composition as 100 molar parts.

By setting the Li content at between 0.1 molar parts and 5 molar parts, it is possible to simultaneously improve the dielectric constant when a DC bias is applied and the high-temperature load lifespan.

A dielectric element according to embodiments of the present invention is provided with the abovementioned dielectric composition.

An electronic component according to embodiments of the present invention is provided with a dielectric layer comprising the abovementioned dielectric composition.

A laminated electronic component according to embodiments of the present invention has a laminated portion formed by alternately laminating an internal electrode layer and a dielectric layer comprising the abovementioned dielectric composition.

A laminated ceramic capacitor according to an embodiment of the present invention will be described below with reference to the figures. It should be noted that the dielectric composition according to embodiments of the present invention may also be used in a dielectric element, and it may also be used in an electronic component other than a laminated ceramic capacitor, such as a single-plate capacitor.

DETAILED DESCRIPTION OF ILLUSTRATIVE EMBODIMENTS

Figure 1:
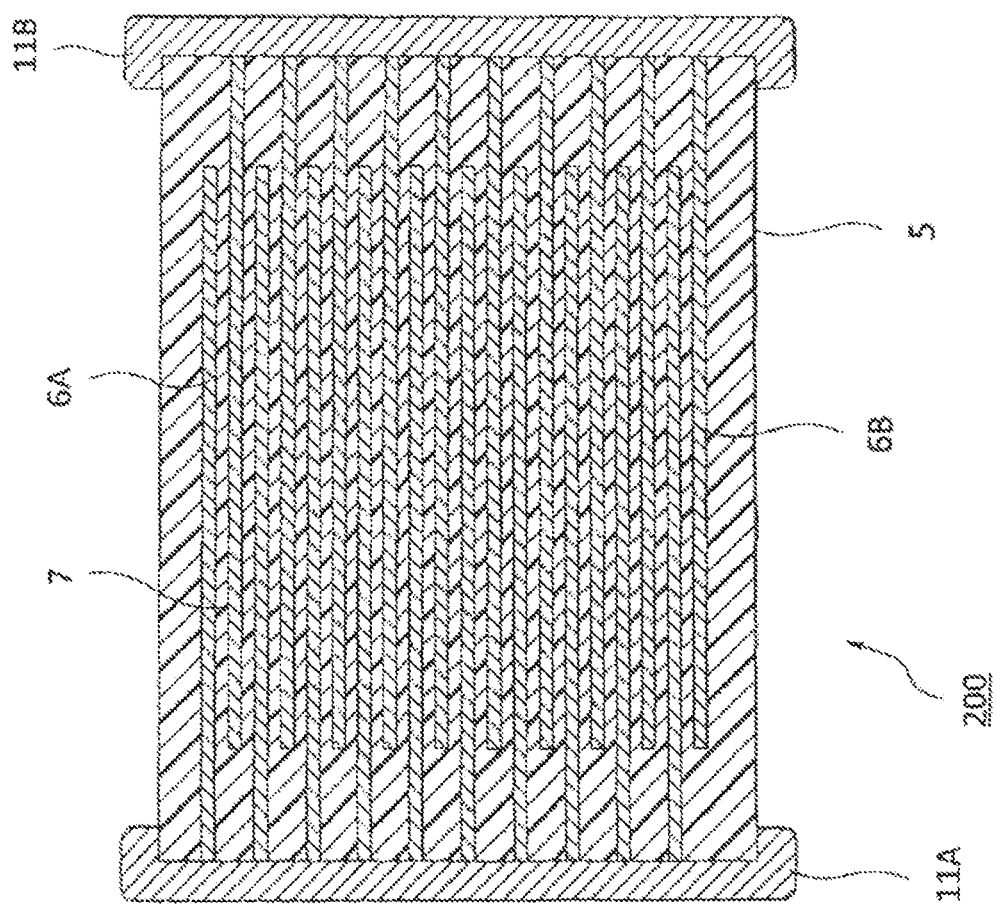
FIG. 1 is a view in cross section of a laminated ceramic capacitor according to an embodiment of the present invention.

FIG. 1 is a schematic cross-sectional diagram of a laminated ceramic capacitor according to an embodiment of the present invention.

As shown in FIG. 1, a laminated ceramic capacitor 200 according to an embodiment of the present invention comprises a capacitor element main body 5 having a structure in which dielectric layers 7 and internal electrode layers 6A, 6B are alternately stacked. The internal electrode layers 6A, 6B are stacked in such a way that the end surfaces thereof are alternately exposed at the surfaces of the two opposing ends of the capacitor element main body 5. A pair of external electrodes 11A, 11B are formed at both ends of the capacitor element main body 5 and are connected to the exposed end surfaces of the internal electrode layers 6A, 6B which are alternately disposed, thereby forming a capacitor circuit.

There is no particular limitation as to the shape of the capacitor element main body 5, but it is normally a cuboid shape. Furthermore, there is no particular limitation as to the dimensions of the capacitor element main body 5. The dimensions are normally, approximately, such that (long side)×(short side)×(height)=(0.6 mm-7.0 mm)×(0.3 mm-6.4 mm)×(0.3 mm-2.5 mm).

The internal electrode layers 6A, 6B are stacked in such a way as to be provided alternately with the dielectric layers 7, and in such a way that the end surfaces thereof are alternately exposed at the surfaces of the two opposing ends of the capacitor element main body 5. Furthermore, the pair of external electrodes 11A, 11B are formed at both ends of the capacitor element main body 5 and are connected to the exposed end surfaces of the internal electrode layers 6A, 6B which are alternately disposed, thereby forming the laminated ceramic capacitor 200.

Furthermore, the internal electrode layers 6A, 6B comprise a conductive material which is a noble metal or a base metal and act essentially as electrodes. Specifically, the conductive material which is a noble metal or a base metal is preferably any of Ag, Ag alloy, Cu or Cu alloy. There is no particular limitation as to metals other than Ag and Cu which are included in the Ag alloy or Cu alloy, but one or more metals selected from Ni, Mn, Cr, Co, Al and W is preferred. Furthermore, when Ag alloy is used, the Ag content is preferably at least 95 wt %, taking said Ag alloy as 100 wt %. When Cu alloy is used, the Cu content is preferably at least 95 wt %, taking said Cu alloy as 100 wt %.

The conductive material may also contain various trace components such as P, C, Nb, Fe, Cl, B, Li, Na, K, F, S or the like in a total amount of no greater than 0.1 wt %.

Various conditions such as the thickness and number of internal electrode layers 6A, 6B should be determined, as appropriate, in accordance with the intended aim or application. The thickness of the internal electrode layers 6A, 6B is preferably around 0.1 μm-4.0 μm and more preferably 0.2 μm-3.0 μm.

The external electrodes 11A, 11B conduct, respectively, with the internal electrode layers 6A, 6B which are alternately disposed inside the capacitor element main body 5, and are formed as a pair at both ends of the capacitor element main body 5. There is no particular limitation as to the metal forming the external electrodes 11A, 11B. One type of metal selected from Ni, Pd, Ag, Au, Cu, Pt, Rh, Ru or Ir etc. may be used alone, or an alloy of two or more metals may equally be used. Cu, Cu alloy, Ni, Ni alloy, Ag, Ag—Pd alloy, or In—Ga alloy etc. is normally used for the external electrodes 11A, 11B.

The thickness of the external electrodes 11A, 11B should be determined, as appropriate, in accordance with the application etc. The thickness of the external electrodes 11A, 11B is preferably around 10-200 μm.

The dielectric layers 7 comprise the dielectric composition according to this embodiment. The thickness of each dielectric layer 7 may be freely set and should be determined, as appropriate, in accordance with the intended aim or application. There is no particular limitation as to the thickness of each dielectric layer 7. The thickness may be set at 1-100 µm, for example. It should be noted that the thickness of each dielectric layer 7 is normally no greater than 30 µm and is preferably no greater than 10 µm from the point of view of reducing the size of the element. Furthermore, there is no particular limitation as to the number of dielectric layers 7. This should be determined, as appropriate, in accordance with the intended aim or application.

Here, the dielectric composition contained in the dialectic layers 7 according to this embodiment has a perovskite crystal structure containing at least Bi, Na, Sr and Ti.

The dielectric composition having a perovskite crystal structure is a polycrystalline material comprising, as the main phase, a perovskite compound represented by the general formula $ABO_3$. The A site includes at least one selected from Bi, Na and Sr, and the B site includes at least Ti.

If the whole of the A site is taken as 100 at. %, the proportion of Bi, Na, Sr occupying the A site is preferably a total of at least 80 at. %. Furthermore, if the whole of the B site is taken as 100 at. %, the proportion of Ti occupying the B site is preferably at least 80 at. %.

Figure 2:
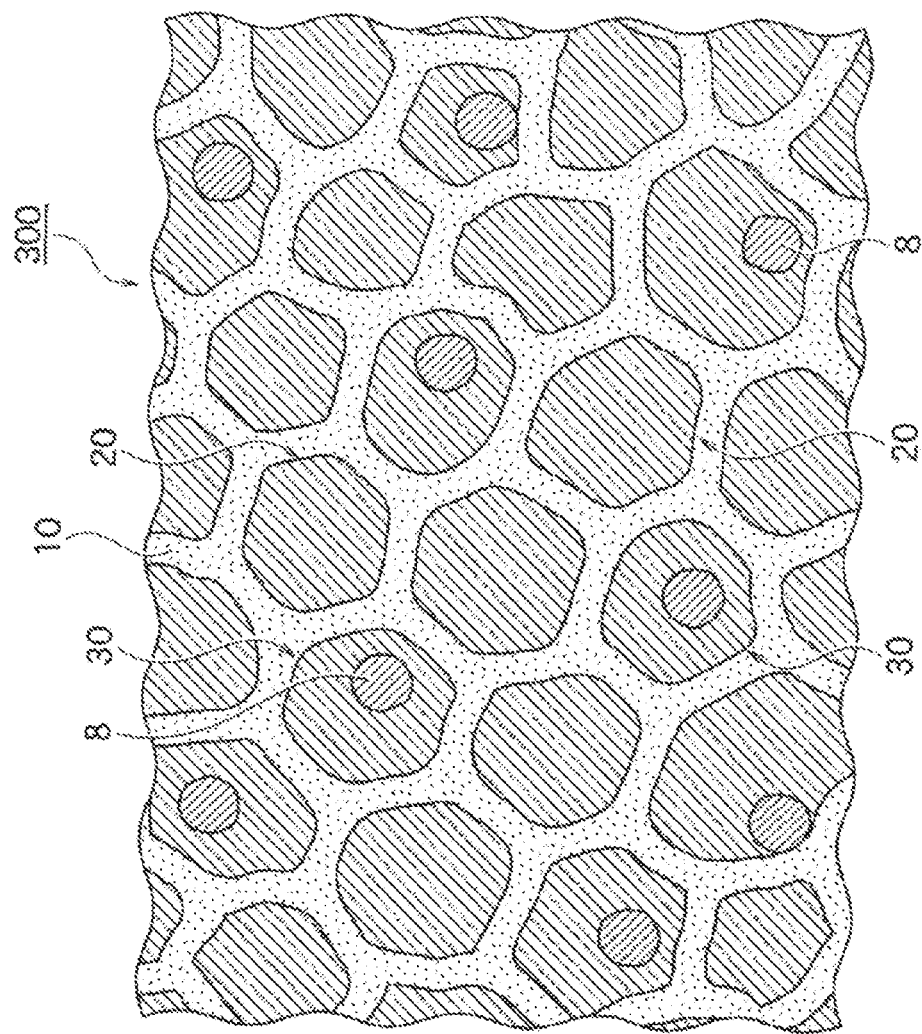
FIG. 2 is an example of the cross section of a dielectric composition according to an embodiment of the present invention.
Figure 3:
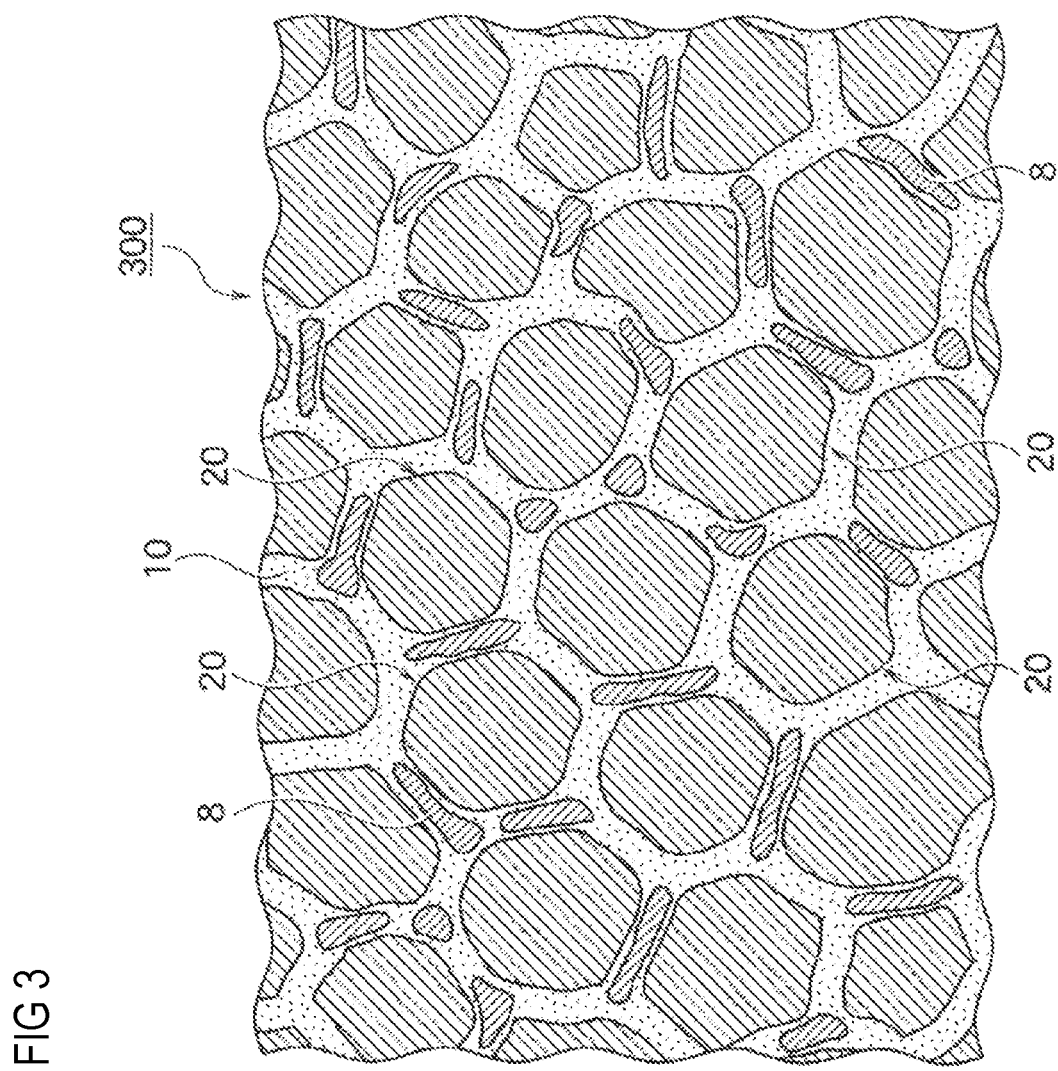
FIG. 3 is an example of the cross section of a dielectric composition according to an embodiment of the present invention.

As indicated above, the dielectric layers 7 according to this embodiment comprise a dielectric composition. As shown in FIG. 2 and FIG. 3, the dielectric composition comprises sintered particles 20 not including a high-Bi phase 8, sintered particles 30 including a high-Bi phase 8, and a grain boundary 10. It should be noted that the dielectric composition contained in the dielectric layers 7 according to this embodiment is a sintered dielectric composition. The sintered particles 20 not including a high-Bi phase and the sintered particles 30 including a high-Bi phase are also referred to collectively below as the "sintered particles 20, 30".

Here, the dialectic composition comprises a high-Bi phase 8 in which the Bi concentration is at least 1.2 times the mean Bi concentration of the dielectric composition as a whole.

Furthermore, in addition to the sintered particles 20, 30 and the grain boundary 10, the dielectric composition may also include pores (air holes) (not depicted). Oxygen is substantially absent from the pores. There is no particular limitation as to the cross-sectional area of the pores, but a value of 5% or less as a surface area proportion with respect to the dielectric composition as a whole is preferred.

The high-Bi phase 8 may be included in the dielectric composition in any form. For example, as shown in FIG. 2, the high-Bi phase 8 may be included in the sintered particles. As shown in FIG. 3, the high-Bi phase 8 may be included in the grain boundary 10. The high-Bi phase 8 may of course be included in both the sintered particles and the grain boundary 10.

There is no particular upper limit to the Bi concentration in the high-Bi phase 8, but a value of no greater than 2.0 times the mean Bi concentration is preferred.

The dielectric composition according to this embodiment has a high-Bi phase 8, and as a result the dielectric constant when a DC bias is applied is maintained in a preferred range while the high-temperature load lifespan is also improved.

On the other hand, a dielectric composition in which the high-Bi phase 8 is absent has a reduced high-temperature load lifespan and reduced reliability in comparison with a dielectric composition in which the high-Bi phase 8 is present.

An example of a method for distinguishing the high-Bi phase 8, a method for determining whether or not a high-Bi phase 8 is present, and a method for calculating the surface area proportion a occupied by the high-Bi phase 8 will be described below.

Using scanning transmission electron microscopy (STEM), an observation field is first of all set in the cross section of the dielectric layers 7 cut at the location of intersection with the internal electrode layers 6A, 6B.

There is no particular limitation as to the surface area of the observation field, but a surface area including around 20-50 of the sintered particles 20, 30 is preferred from the point of view of EDS analysis accuracy and analysis efficiency. To be specific, the observation field preferably has a size of the order of 5 m×5 µm. Furthermore, the magnification of the observation field is preferably between 10,000 and 50,000 times.

Composition mapping analysis is then carried out in the whole observation field by means of energy dispersive X-ray spectroscopy (EDS), and the X-ray spectrum for elemental Bi is measured. The mean concentration of elemental Bi included in the observation field as a whole (mean Bi concentration) is calculated from the resulting X-ray spectrum. A mapping image for the elemental Bi is then subjected to image processing in such a way that it is possible to distinguish regions in which the elemental Bi concentration is at least 1.2 times the mean Bi concentration (high-Bi phase 8) and regions in which the value is less than 1.2 times.

The surface area proportion a occupied by the high-Bi phase 8 with respect to the field as a whole is then calculated from the mapping image which has undergone image processing. Specifically, the surface area proportion a with respect to the field as a whole is calculated by selecting all of the high-Bi phases in the mapping image and counting the number of pixels occupied by the selected regions.

In this application, if a high-Bi phase 8 is present somewhere in the observation field as a whole, a high-Bi phase in which the Bi concentration is at least 1.2 times the mean Bi concentration of the dielectric composition as a whole is deemed to be included. Conversely, if a high-Bi phase 8 is not present anywhere in the observation field as a whole, a high-Bi phase in which the Bi concentration is at least 1.2 times the mean Bi concentration of the dielectric composition as a whole is deemed not to be included.

It should be noted that a high-Bi phase 8 which is not apparent in the mapping image is deemed to be absent because the cross-sectional area is not large enough to satisfy the cross-sectional area corresponding to one pixel.

An example of a method for distinguishing the high-Bi phase 8 and a method for calculating the surface area proportion a occupied by the high-Bi phase 8 has been described above, but there is no particular limitation as to the method for distinguishing the high-Bi phase 8 and the method for calculating the surface area proportion a occupied by the high-Bi phase 8. Transmission electron microscopy (TEM) may equally be used instead of STEM, for example.

It should be noted that it is possible to appropriately control the formation or otherwise of the high-Bi phase 8 and the surface area proportion a by means of the make-up of the dielectric composition and the method for producing same, and also the baking conditions etc. For example, by including a starting material powder having a large particle size or performing baking at a relatively low temperature, it is possible to promote formation of the high-Bi phase 8. Furthermore, by adding Li as a second auxiliary component to be described later, it is possible to promote formation of the high-Bi phase 8 especially at the grain boundary 10.

The surface area proportion a is preferably such that $0<\alpha \le 0.150$. When $0<\alpha \le 0.150$ is satisfied, it is possible to further improve the high-temperature load lifespan. The surface area proportion a is more preferably such that $0.001 \le \alpha \le 0.150$.

Furthermore, the dielectric composition according to this embodiment is preferably such that the molar ratio β of the Bi content with respect to the Sr content satisfies $0.125 \le \beta \le 2.00$. When β is within the abovementioned range, the dielectric constant when a DC bias is applied is further improved.

Furthermore, the dielectric composition according to this embodiment may include at least one selected from among La, Ce, Pr, Nd, Sm, Eu, Gd, Tb, Dy, Ho, Yb, Ba, Ca, Mg and Zn (also referred to below as the "first auxiliary component"). By incorporating the first auxiliary component, the DC bias characteristics are further improved.

The content of the first auxiliary component is preferably between 1 molar part and 15 molar parts, taking the Ti content of the dielectric composition as 100 molar parts. When the content of the first auxiliary component is within the abovementioned range, the DC bias characteristics are further improved. The content of the first auxiliary component is more preferably between 1 molar part and 10 molar parts.

Furthermore, the dielectric composition according to this embodiment may also include Li (also referred to below as the "second auxiliary component"). The content of the second auxiliary component is preferably between 0.1 molar parts and 5 molar parts, taking the Ti content of the dielectric composition as 100 molar parts. When the content of the second auxiliary component is within the abovementioned range, the high-temperature load lifespan is further improved. The content of the second auxiliary component is more preferably between 1 molar part and 5 molar parts.

There is no particular limitation as to the method for producing the laminated ceramic capacitor according to this embodiment. For example, it is produced in the same way as a conventional laminated ceramic capacitor, namely by preparing a green chip using a normal sheet method or printing method employing a paste, baking the green chip and then printing or transcribing external electrodes and then baking. The method for producing the laminated ceramic capacitor will be described in specific terms below.

There is no particular limitation as to the type of paste for the dielectric layers. For example, said paste may be an organic paint comprising a mixture of a dielectric starting material and an organic vehicle, or it may be an aqueous paint comprising a mixture of a dielectric starting material and an aqueous vehicle.

For the dielectric starting material, it is possible to use a metal contained in the abovementioned dielectric composition, for example, an oxide of a metal selected from the group consisting of Bi, Na, Sr, Ti, La, Ce, Pr, Nd, Sm, Eu, Gd, Tb, Dy, Ho, Yb, Ba, Ca, Mg, Zn, and Li, or a mixture thereof, or a composite oxide may be used. In addition, the dielectric starting material may be appropriately selected from various types of compounds which form the abovementioned oxides or composite oxides as a result of baking, e.g., carbonates, oxalates, nitrates, hydroxides and organometallic compounds etc. and these may be mixed for use. A powder having a mean particle size of the order of 0.1-3 μm is used as the dielectric starting material. The dielectric starting material is preferably a powder having a mean particle size of 0.1-1 μm. Furthermore, the mean particle size of the dielectric starting material may be adjusted by appropriately varying the time for which said material is mixed.

When the paste for the dielectric layers is an organic paint, the dielectric starting material and an organic vehicle in which a binder or the like is dissolved in an organic solvent should be mixed. There is no particular limitation as to the binder which is used in the organic vehicle, and it may be appropriately selected from various conventional binders such as ethyl cellulose and polyvinyl butyral. Furthermore, there is no particular limitation as to the organic solvent which is used in the organic vehicle, and it may be appropriately selected from various types of organic solvents such as terpineol, butyl carbitol, acetone and toluene, in accordance with the method which is used, namely the printing method or sheet method etc.

Furthermore, when the paste for the dielectric layers is an aqueous paint, the dielectric starting material and an aqueous vehicle in which a water-soluble binder and a dispersant etc. are dissolved in water should be mixed. There is no particular limitation as to the water-soluble binder which is used in the aqueous vehicle, and it is possible to use polyvinyl alcohol, cellulose or water-soluble acrylic resin, for example.

The paste for the internal electrode layers is prepared by mixing a conductive material comprising various metals or alloys described above, or various types of oxide which form the conductive material after baking, organometallic compounds, resinates, and the like, with the abovementioned organic vehicle or aqueous vehicle. The paste for the external electrodes may be prepared in the same way as the paste for the internal electrode layers.

When an organic vehicle is used to prepare the abovementioned pastes, there is no particular limitation as to the content of said organic vehicle. For example, the binder may be present in an amount of the order of 1-5 wt % and the organic solvent may be present in an amount of the order of 10-50 wt %, with respect to the dielectric starting material. Furthermore, the pastes may contain additives selected from various types of dispersants, plasticizers, dielectrics, and insulators etc., as required. The total content of these additives is preferably no greater than 10 wt %.

When a printing method is used, the paste for the dielectric layers and the paste for the internal electrode layers are printed alternately and repeatedly on a substrate made of polyethylene terephthalate (PET) or the like. After the printing, the pastes are cut to a predetermined shape, after which they are peeled from the substrate to form a green chip.

When the sheet method is used, a green sheet is formed using the paste for the dielectric layers, and the paste for the internal electrode layers is printed on the green sheet. After this, the green sheets are peeled, stacked and cut to form a green chip.

Before the green chip is baked, a debinding treatment is performed. There is no particular limitation as to the conditions of the debinding treatment and it should be carried out under normal conditions.

The debinding treatment is preferably carried out under a reducing atmosphere when a base metal alone or an alloy comprising a base metal, such as Cu or Cu alloy, is used for the conductive material of the internal electrode layers. There is no particular limitation as to the type of reducing atmosphere, and it is possible to use humidified $N_2$ gas or a mixed gas comprising humidified $N_2$ and $H_2$, among others.

There is no particular limitation as to the temperature increase rate, holding temperature and temperature holding time in the debinding treatment. The temperature increase rate is preferably 0.1-100° C./hr and more preferably 1-10° C./hr. The holding temperature is preferably 200-500° C.

and more preferably 300-450° C. The temperature holding time is preferably 1-48 hours and more preferably 2-24 hours. The organic component such as the binder component is preferably removed down to around 300 ppm by means of the debinding treatment, and more preferably removed down to around 200 ppm.

The baking atmosphere when the green chip is baked to obtain the capacitor element main body should be appropriately determined in accordance with the type of conductive material in the paste for the internal electrode layers.

When a base metal alone or an alloy comprising a base metal, such as Cu or Cu alloy, is used as the conductive material in the paste for the internal electrode layers, the oxygen partial pressure in the baking atmosphere is preferably set at $10^{-6}$ to $10^{-8}$ atm. By setting the oxygen partial pressure at $10^{-8}$ atm or greater, it is possible to restrict degradation of the perovskite crystal structure contained in the dielectric composition and a reduction in the high-temperature load lifespan. Furthermore, by setting the oxygen partial pressure at $10^{-6}$ atm or less, it is possible to restrict oxidation of the internal electrode layers.

Furthermore, the holding temperature during baking is 900-1400° C., preferably 900-1200° C., and more preferably 1000-1100° C. By setting the holding temperature at 900° C. or greater, this makes densification more likely to progress adequately due to baking. Furthermore, when the holding temperature is set at 1200° C. or less, this facilitates suppressing diffusion of the various materials forming the internal electrode layers and abnormal sintering of the internal electrode layers. By suppressing abnormal sintering of the internal electrode layers, this facilitates preventing breakage of the internal electrodes. By suppressing diffusion of the various materials forming the internal electrode layers, this facilitates preventing a reduction in the high-temperature load lifespan.

By appropriately setting the holding temperature during baking in the abovementioned temperature range, this makes it easier to control the crystal grain size, as appropriate. Furthermore, there is no particular limitation as to the baking atmosphere. The baking atmosphere is preferably a reducing atmosphere so as to restrict oxidation of the internal electrode layers. There is no particular limitation as to the atmospheric gas. A mixed gas comprising $N_2$ and $H_2$ which is humidified is preferably used as the atmospheric gas, for example. Furthermore, there is no particular limitation as to the baking time.

Annealing (reoxidation) may be carried out after the baking during the production of the laminated ceramic capacitor according to this embodiment. The annealing should be carried out under normal conditions. There is no particular limitation as to the annealing atmosphere, but an atmosphere in which the dielectric layers are oxidized and the internal electrode layers are not oxidized is preferred. Humidified $N_2$ gas or a mixed gas comprising humidified $N_2$ and $H_2$ etc. may be used, for example.

A wetter or the like should be used in order to humidify the $N_2$ gas or the mixed gas comprising $N_2$ and $H_2$ etc. in the abovementioned debinding treatment, baking and annealing. In this case, the water temperature is preferably around 20-90° C.

The debinding treatment, baking and annealing processes may be carried out successively or independently. When these processes are performed successively, the following procedure is preferred, namely that the debinding treatment is performed, after which the atmosphere is modified without cooling and then baking is carried out by raising the temperature to the holding temperature for baking. On the other hand, when these processes are performed independently, the following procedure is preferred, namely that during baking the temperature is raised under an $N_2$ gas atmosphere to the holding temperature for the debinding treatment, after which the atmosphere is modified to the atmosphere for baking, and after the atmosphere has been modified, temperature increase is continued to the holding temperature for baking. After the baking, cooling is performed to the holding temperature for the debinding treatment, after which the atmosphere is once again modified to an $N_2$ gas atmosphere and cooling is further continued. It should be noted that the abovementioned $N_2$ gas may or may not be humidified.

The end surfaces of the capacitor element main body obtained in this way are polished by means of barrel polishing or sandblasting, for example, the paste for the external electrodes is printed or transcribed thereon, baking is carried out and the external electrodes are formed. The paste for the external electrodes is preferably baked at 600-800° C. for around 10 minutes to 1 hour under a humidified mixed gas comprising $N_2$ and $H_2$, for example. A coating layer is then formed on the external electrode surface, as required. The coating layer is formed by means of plating or the like.

A laminated ceramic capacitor according to an embodiment of the present invention and a method for producing same have been described above, but the present invention is in no way limited to this embodiment and various embodiments may of course be implemented within a scope that does not depart from the present invention.

The dielectric element, electronic component and laminated electronic component according to embodiments of the present invention are advantageously used in a location where a relatively high rated voltage is applied. For example, they may be advantageously used in a power supply circuit having a high rated voltage, such as in a DC-DC converter or an AC-DC inverter, for example.

Furthermore, there is no particular limitation as to the application of the laminated ceramic capacitor according to an embodiment of the present invention. For example, it may be used in a snubber capacitor for circuit protection for which there is a need for a high dielectric constant when a high DC bias is applied, or it may be used in a smoothing capacitor for an AC-DC inverter that converts alternating current to direct current.

Furthermore, the laminated ceramic capacitor according to this embodiment is mounted on a printed circuit board or the like by means of soldering etc. The printed circuit board is then used in various electronic devices, e.g., a digital television or a modem etc.

In addition, the dielectric composition according to embodiments of the present invention does not contain lead. The inventive dielectric composition, dielectric element, electronic component and laminated electronic component are therefore also superior from an environmental point of view.

The present invention will be described below in further detail with the aid of exemplary embodiments and comparative examples. However, the present invention is not limited by the following exemplary embodiments. It should be noted that, according to embodiments of the present invention, the DC field applied to the dielectric composition, dielectric element, electronic component and laminated electronic component is referred to as a DC (direct current) bias. Furthermore, the rate of change in the dielectric constant before and after application of the DC bias is referred to as the DC bias characteristics. The DC bias characteristics are better the smaller the absolute value of the rate of change of the dielectric constant.

The following starting material powders were prepared as starting materials for producing dielectric layers: bismuth oxide ($Bi_2O_3$), sodium carbonate ($Na_2CO_3$), strontium carbonate ($SrCO_3$), barium carbonate ($BaCO_3$), calcium carbonate ($CaCO_3$), magnesium carbonate ($MgCO_3$), zinc oxide (ZnO), lanthanum hydroxide ($La(OH)_3$), neodymium oxide ($Nd_2O_3$), samarium oxide ($Sm_2O_3$), gadolinium oxide ($Gd_2O_3$) and titanium oxide ($TiO_2$).

The abovementioned starting material powders were weighed out in such a way that the baked dielectric compositions had the make-up shown in table 1.

The weighed starting material powders were then wet-mixed using a ball mill, after which the resulting mixtures were calcined for 2 hours under the air at 750° C.-850° C. to obtain calcined powders.

$Li_2CO_3$ was then prepared as a Li starting material powder constituting a second auxiliary component. The starting material powder was weighed out in such a way that the compositions after baking conformed to the compositions shown in table 1, and said starting material powder was mixed with the abovementioned calcined powders to obtain mixed powders.

An organic solvent and an organic vehicle were then added to the mixed powders, the material was wet-mixed using a ball mill and paste for dielectric layers was prepared. At the same time, Ag powder, Ag—Pd alloy powder or Cu powder was mixed with an organic vehicle as a conductive material powder, and pastes for internal electrode layers comprising Ag, Ag—Pd alloy or Cu were prepared. The paste for dielectric layers was then moulded into sheets by means of a sheet-moulding method, and ceramic green sheets were obtained.

The paste for the internal electrode layers was coated on the ceramic green sheets by means of screen printing to print the internal electrode layers. The ceramic green sheets on which the internal electrode layers had been printed were then stacked, after which they were cut to a predetermined shape, whereby laminated green chips were prepared. The laminated green chips were subjected to debinding at 300° C.-500° C. to remove the organic component down to around 300 ppm. After the debinding, baking was carried out under the atmosphere or under a reducing atmosphere at a baking temperature of 900° C.-1400° C. The baking time was varied as appropriate. A mixed gas comprising humidified $N_2$ and $H_2$ was used as the atmospheric gas when baking was carried out under a reducing atmosphere.

The end surfaces of the resulting laminated ceramic baked articles were polished, after which In—Ga was applied thereto as the external electrodes, and samples of the laminated ceramic capacitor shown in FIG. 1 were obtained. The size of the resulting laminated ceramic capacitor samples was 3.2 mm×1.6 mm×0.6 mm, the thickness of the dielectric layers was 20 µm, the thickness of the internal electrode layers was 1.5 µm, and there were four dielectric layers interposed between the internal electrode layers.

It should be noted that when the dielectric layers of the laminated ceramic baked articles were dissolved by means of a solvent and analysed by means of ICP optical emission spectroscopy, it was confirmed that the composition of the dielectric layers was the same as the compositions shown in table 1.

Furthermore, a cross section at the intersection of the internal electrode layers was cut from the laminated ceramic baked articles and the crystal structure of the dielectric layers at that cross section was measured and analysed by means of X-ray diffraction. As a result, it was confirmed that the dielectric layers of the laminated ceramic baked articles comprised a composition having a perovskite crystal structure.

The surface area proportion of the high-Bi phase and the mean concentration of elemental Bi were then measured using the method described below for each of the laminated ceramic baked articles obtained. The dielectric constant, DC bias characteristics and high-temperature load lifespan were then measured using the method described below.

A cross section at the intersection of the internal electrode layers was first of all cut from the laminated ceramic baked articles obtained, and the cross sections which had been cut were cut into flakes by means of a gallium ion beam to prepare samples for cross-sectional observation.

Surface Area Proportion a of the High-Bi Phase

The cross section of the dielectric layers cut at the position of intersection with the internal electrode layers was observed by means of scanning transmission electron microscopy (STEM). It should be noted that the observation field was 5 m×5 µm and the magnification was 30 000 times. Mapping analysis was performed in the whole field set in the cross section of the dielectric layers by means of energy dispersive X-ray spectroscopy (EDS), and the X-ray spectrum of elemental Bi was measured. The mean concentration of elemental Bi included in the whole field was calculated from the resulting X-ray spectrum. A mapping image for the elemental Bi was then subjected to image processing in such a way as to distinguish a phase in which the elemental Bi concentration was at least 1.2 times the mean concentration (high-Bi phase) and a phase in which the value was less than 1.2 times. The surface area proportion a occupied by the high-Bi phase in the field as a whole was then calculated from the image which had undergone image processing. The surface area proportion a with respect to the field as a whole was calculated by counting the number of pixels occupied by the high-Bi phase in the image which had undergone image processing, and dividing this number by the total number of pixels in the field as a whole. The results are shown in table 1.

Dielectric Constant ε1

The capacitance of the laminated ceramic capacitor samples was measured at 25° C. and a frequency of 1 kHz by inputting a signal having an input signal level (measurement voltage) of 1 Vrms using a digital LCR meter (Hewlett-Packard; 4284A). The dielectric constant ε1 (no units) was then calculated from the measured capacitance, surface area of facing electrodes and interlayer distance. In the present exemplary embodiments, the mean value calculated from 10 laminated ceramic capacitor samples was used as the dielectric constant ε1. The results are shown in table 1.

Dielectric Constant ε2

The dielectric constant ε2 (no units) was calculated from the capacitance measured from conditions of frequency 1 kHz and input signal level (measurement voltage) 1.0 Vrms, surface area of facing electrodes and interlayer distance, while a DC bias generator (GLASSMAN HIGH VOLTAGE; WX10P90) was connected to a digital LCR meter (Hewlett-Packard; 4284A) and a DC bias of 8 V/µm was applied to the laminated ceramic capacitor samples. In the present exemplary embodiments, the mean value calculated from 10 laminated ceramic capacitor samples was used as the dielectric constant ε2. A value of 800 or greater for the dielectric constant ε2 was deemed to be good and a value of 1000 or greater was deemed to be better in the present exemplary embodiments. The results are shown in table 1.

DC Bias Characteristics

The DC bias characteristics were calculated by means of the following formula (1) using the dielectric constant ε1 and the dielectric constant ε2. Although superior DC bias characteristics are not essential for achieving the aim of embodiments of the present invention, a smaller absolute value for the DC bias characteristics is preferable. DC bias characteristics within ±30% were deemed to be good in the present exemplary embodiments. It should be noted that it is not realistic for the DC bias characteristics to exceed +30%. There is therefore essentially no upper limit to the preferred range for the DC bias characteristics.

$$\text{DC bias characteristics (\%)} = 100 \times (\varepsilon 2 - \varepsilon 1)/\varepsilon 1 \quad \text{Formula (1)}$$

High-Temperature Load Lifespan

The high-temperature load lifespan was measured for the laminated ceramic capacitor samples by maintaining a state of DC voltage application under an electric field of 50 V/μm at 150° C. In the present exemplary embodiments, the high-temperature load lifespan was defined as the time from the start of DC voltage application until the insulation resistance fell to a single digit. Furthermore, the high-temperature load lifespan was measured for 10 laminated ceramic capacitor samples and the mean value thereof was calculated. A value of 20 hours or greater was deemed to be good, a value of 30 hours or greater was deemed to be better, and a value of 35 hours or greater was deemed to be even better in the present exemplary embodiments. The results are shown in table 1.

TABLE 1

| Sample no. | Surface area High-Bi phase ○: present X: absent | Surface area proportion α of high-Bi phase | Molar ratio β of Bi with respect to Sr | First auxiliary component Type | First auxiliary component Amount (molar parts) | Second auxiliary component Li (molar parts) | Dielectric constant ε1 | Dielectric constant ε2 | DC bias characteristics (%) | High-temperature load lifespan (hr) |
|---|---|---|---|---|---|---|---|---|---|---|
| Exemplary Embodiment 1 | ○ | 0.179 | 2.833 | — | — | — | 1916 | 802 | −58.1 | 23 |
| Exemplary Embodiment 2 | ○ | 0.161 | 2.000 | — | — | — | 1848 | 1042 | −43.8 | 22 |
| Exemplary Embodiment 3 | ○ | 0.001 | 0.125 | — | — | — | 1547 | 1053 | −31.9 | 31 |
| Exemplary Embodiment 4 | ○ | 0.150 | 1.500 | — | — | — | 2100 | 1400 | −33.3 | 30 |
| Exemplary Embodiment 5 | ○ | 0.052 | 1.167 | — | — | — | 2485 | 1318 | −47.0 | 32 |
| Exemplary Embodiment 6 | ○ | 0.054 | 1.167 | La | 1 | — | 2035 | 1455 | −28.5 | 33 |
| Exemplary Embodiment 7 | ○ | 0.076 | 1.167 | La | 15 | — | 1907 | 1795 | −5.9 | 34 |
| Exemplary Embodiment 8 | ○ | 0.031 | 0.500 | La | 15 | — | 1233 | 1009 | −18.2 | 30 |
| Exemplary Embodiment 9 | ○ | 0.040 | 0.500 | La | 15 | 0.1 | 1200 | 1005 | −16.3 | 37 |
| Exemplary Embodiment 10 | ○ | 0.085 | 0.500 | La | 15 | 5.0 | 1160 | 1002 | −13.6 | 42 |
| Exemplary Embodiment 11 | ○ | 0.065 | 2.000 | Sm | 5 | — | 1729 | 1552 | −10.2 | 32 |
| Exemplary Embodiment 12 | ○ | 0.063 | 2.000 | Nd | 5 | — | 1717 | 1541 | −10.3 | 33 |
| Exemplary Embodiment 13 | ○ | 0.072 | 2.000 | Gd | 5 | — | 1735 | 1511 | −12.9 | 31 |
| Exemplary Embodiment 14 | ○ | 0.033 | 0.711 | Mg | 5 | — | 2374 | 1827 | −23.0 | 34 |
| Exemplary Embodiment 15 | ○ | 0.030 | 0.711 | Zn | 5 | — | 2118 | 1748 | −17.5 | 34 |
| Exemplary Embodiment 16 | ○ | 0.044 | 0.625 | Ba | 10 | — | 1912 | 1745 | −8.7 | 31 |
| Exemplary Embodiment 17 | ○ | 0.042 | 0.625 | Ca | 10 | — | 1880 | 1608 | −14.5 | 33 |
| Comparative Example 1 | X | — | 2.000 | La | 5 | — | 1783 | 1794 | 0.6 | 16 |
| Comparative Example 2 | X | — | 2.833 | — | — | — | 1944 | 856 | −56.0 | 15 |

It can be seen from table 1 that the laminated ceramic capacitors according to Exemplary Embodiments 1-17 in which a high-Bi phase was present exhibited a dielectric constant ε2 when a DC bias of 8 V/μm was applied of 800 or greater and a high-temperature load lifespan of 20 hours or greater.

Furthermore, the laminated ceramic capacitors according to Exemplary Embodiments 3-17 in which the surface area proportion a of the high-Bi phase was such that 0<α≤0.150 exhibited a high-temperature load lifespan of 30 hours or greater, and this was an even better high-temperature load lifespan.

On the other hand, the laminated ceramic capacitors according to Comparative Examples 1 and 2 in which a high-Bi phase was not present exhibited a high-temperature load lifespan of less than 20 hours.

Furthermore, the laminated ceramic capacitors according to Exemplary Embodiments 2-17 in which the molar ratio β of Bi with respect to Sr was such that 0.125≤β≤2.000 exhibited a dielectric constant ε2 when a DC bias of 8 V/μm was applied of 1000 or greater, and this was even better.

The laminated ceramic capacitors according to Exemplary Embodiments 6-17 comprising between 1 molar part and 15 molar parts of the first auxiliary component exhibited DC bias characteristics within ±30%. That is to say, the laminated ceramic capacitor samples comprising the first auxiliary component exhibited a good dielectric constant ε2 when a DC bias was applied, a good high-temperature load lifespan, and also good DC bias characteristics.

Furthermore, the laminated ceramic capacitors according to Exemplary Embodiments 9 and 10 comprising between 0.1 molar parts and 5 molar parts of the second auxiliary component exhibited a high-temperature load lifespan of 35 hours or greater, and this was even better.

The invention claimed is:

1. A dielectric composition comprising:
    a perovskite crystal structure containing at least Bi, Na, Sr and Ti,
    wherein the dielectric composition includes a high-Bi phase in which a Bi concentration is at least 1.2 times a mean Bi concentration in the dielectric composition as a whole.

2. The dielectric composition according to claim 1, wherein $0<\alpha\leq 0.150$, where $\alpha$ is a surface area proportion of the high-Bi phase in a cross section of the dielectric composition, with respect to the whole of the cross section.

3. The dielectric composition according to claim 1, wherein $0.125\leq\beta\leq 2.000$, where $\beta$ is a molar ratio of Bi with respect to Sr in the dielectric composition.

4. The dielectric composition according to claim 1, further comprising at least one element selected from the group consisting of La, Ce, Pr, Nd, Sm, Eu, Gd, Tb, Dy, Ho, Yb, Ba, Ca, Mg and Zn.

5. The dielectric composition according to claim 4, wherein a content of the element is between 1 molar part and 24 molar parts, taking a Ti content of the dielectric composition as 100 molar parts.

6. The dielectric composition according to claim 1, further comprising Li, wherein a Li content is between 0.1 molar parts and 14 molar parts, taking a Ti content of the dielectric composition as 100 molar parts.

7. A dielectric element comprising the dielectric composition according to claim 1.

8. An electronic component comprising a dielectric layer comprising the dielectric composition according to claim 7.

9. A laminated electronic component comprising:
    a laminated portion formed by alternately laminating an internal electrode layer and a dielectric layer comprising the dielectric composition according claim 1.

10. A single-plate capacitor comprising the dielectric composition according to claim 1.

11. A laminated ceramic capacitor comprising:
    a capacitor element main body having a structure in which dielectric layers comprising the dielectric composition according to claim 1 and internal electrode layers are alternately stacked; and
    a pair of terminal electrodes located at both ends of the capacitor element main body and connected to exposed end surfaces of the internal electrode layers which are alternately disposed, thereby forming a capacitor circuit.

12. The laminated ceramic capacitor according to claim 11, wherein a conductive material of the internal electrode layers comprises Cu.

13. The laminated ceramic capacitor according to claim 11, wherein a conductive material of the internal electrode layers comprises a Cu alloy.

14. The laminated ceramic capacitor according to claim 11, wherein a base metal is used as a conductive material for the internal electrode layers.

15. The laminated ceramic capacitor according to claim 11, wherein the terminal electrodes comprise Cu.

16. The laminated ceramic capacitor according to claim 11, wherein the terminal electrodes comprise a Cu alloy.

17. A method for producing a laminated ceramic capacitor, the method comprising:
    preparing a green chip using a sheet method or a printing method employing a paste for dielectric layers and a paste for internal electrodes, wherein the paste for the dielectric layers is an organic paint comprising a mixture of a dielectric starting material and an organic vehicle or wherein the paste for the dielectric layers is an aqueous paint comprising a mixture of a dielectric starting material and an aqueous vehicle;
    performing a debinding treatment on the green chip;
    baking the green chip thereby forming a main body;
    printing or transcribing external electrodes on the main body; and
    baking the main body,
    wherein the dielectric starting material is selected such that a baked dielectric composition has a perovskite crystal structure containing at least Bi, Na, Sr and Ti, and
    wherein the dielectric composition includes a high-Bi phase in which a Bi concentration is at least 1.2 times a mean Bi concentration in the dielectric composition as a whole.

18. The method according to claim 17, wherein a base metal alone or an alloy comprising a base metal is used for a conductive material of the internal electrodes.

19. The method according to claim 17, wherein Cu is used for a conductive material of the internal electrodes.

20. The method according to claim 17, wherein a Cu alloy is used for a conductive material of the internal electrodes.

* * * * *